Dec. 3, 1929.  O. F. LUNDELIUS ET AL  1,737,856
STEERING MECHANISM FOR SPRING SUPPORTED VEHICLES
Filed Dec. 13, 1926   3 Sheets-Sheet 1
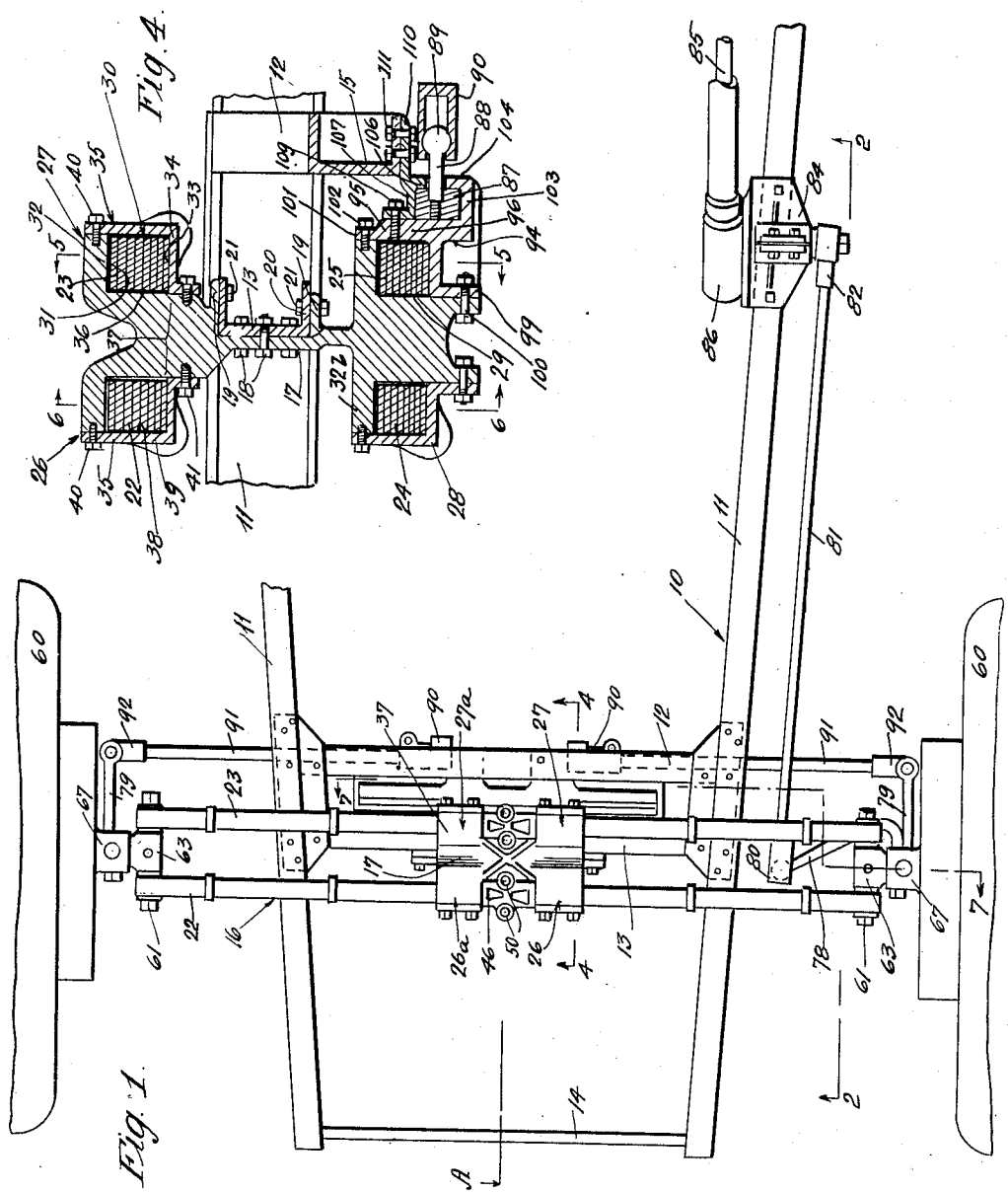
Inventors.
Oscar F. Lundelius
Melvin N. Lefler
Attorney.

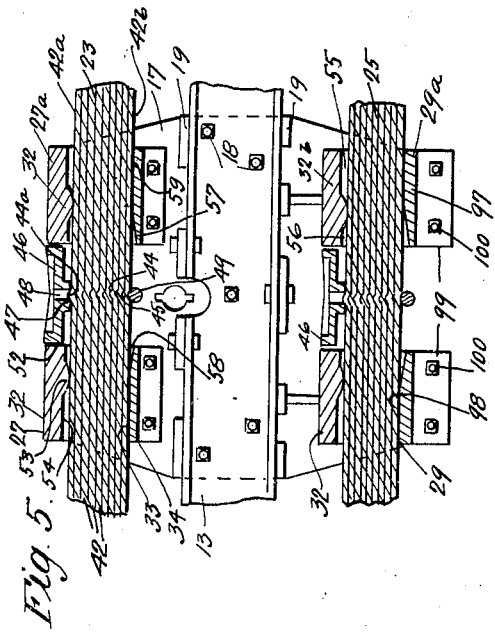

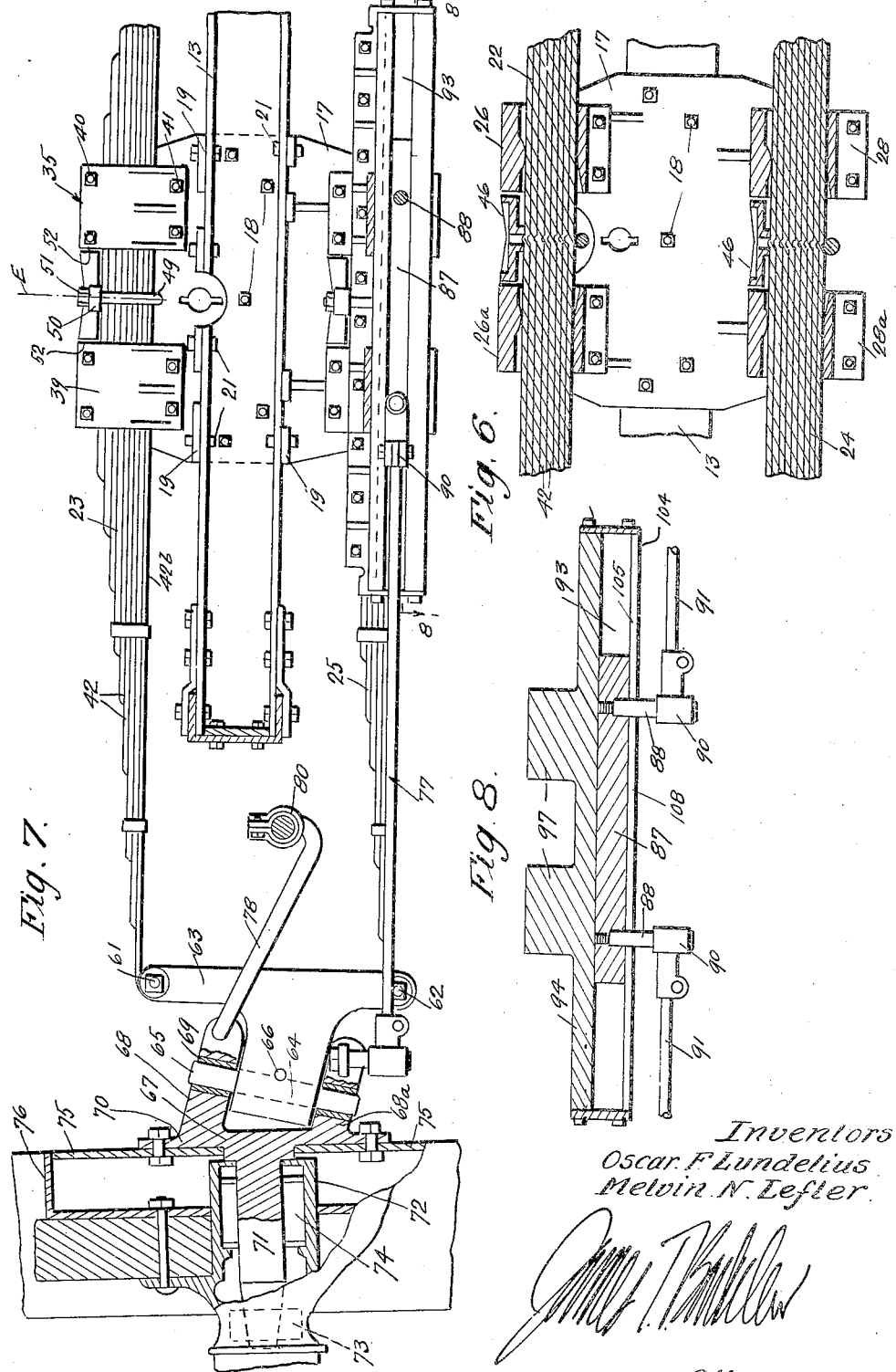

Patented Dec. 3, 1929

1,737,856

UNITED STATES PATENT OFFICE

OSCAR F. LUNDELIUS AND MELVIN N. LEFLER, OF LOS ANGELES, CALIFORNIA, ASSIGNORS TO LUNDELIUS & ECCLESTON MOTORS CORPORATION, OF LAS VEGAS, NEVADA, A CORPORATION OF DELAWARE

STEERING MECHANISM FOR SPRING-SUPPORTED VEHICLES

Application filed December 13, 1926. Serial No. 154,384.

This invention has to do generally with steering mechanisms for spring supported vehicles, and is more particularly concerned with mechanisms of this type adapted to be applied to vehicles wherein the wheels are laterally spaced and connected to the vehicle body directly by the spring system rather than by rigid axles.

There is a steering problem peculiar to this type of spring support, and it is the general object of this invention to meet this problem effectively. Since the springs form a sole, yielding, lateral spacer between the wheels, it follows that when said springs flex the wheels move laterally towards and away from each other. The dirigible wheels are, of course, connected by a tie rod in order that the steering power need be applied directly only to one of the wheels, the steering movement being imparted to the other wheel through this tie rod. Now were this tie rod to be rigid throughout, it will be seen that it would be exposed to excessive strains of longitudinal compression and tension as the wheels move toward and away from each other. Such strains are found, from actual practice, to result not only in excessive wear, but also in crystallization of the rod and resultant comparative early failure thereof. As will be readily recognized, any failure of the steering mechanism is almost sure to result in disastrous accident.

We meet this problem effectively by providing an articulated or jointed tie-bar whereby steering movement from one wheel to the other is imparted just as effectively as though the bar were rigid throughout, but so acting during spring flexure that the changes in distance between the wheels due to spring flexure are automatically compensated so the bar is exposed to no appreciable amount of longitudinal compression or tension.

This is accomplished generally by the provision of a centrally arranged block which is slidable on the vehicle for movement transversely thereof or in the direction of the longitudinal axis of the spring system, and a pair of arms pivotally connected to said block at points spaced longitudinally from the center thereof and extending oppositely into pivotal connection with the spring supporting wheels. The proportion and positioning of the tie rod elements are such with relation to the springs and their mountings that the arms or rods move pivotally in a manner substantially to follow the free ends of the springs or rather to move with the outer ends of the rods following paths substantially parallel to the paths of the spring terminals, wheel plates and wheels.

Another very important feature of the invention lies in the fashioning and mounting of my steering mechanism in such a manner that it is readily accessible for inspection or repair, is easily kept in working condition as far as lubrication and cleaning is concerned, and is so sturdy and has so few working parts that it is well adapted to withstand severe service conditions.

Another feature lies in connection with the utilization of certain elements of the mounting of the steering mechanism in a manner to cooperate with the spring mounting both to brace the latter and to act as a spring keeper. The consequent elimination of parts is of obvious advantage. However, it will be understood that this feature of multiple function is not restrictive on the broader claims, since the invention may be applied in other situations where such functions are not called for.

How this is done will be made apparent in the following detailed description wherein other objects and novel features of the invention will be made apparent. Reference will be had to the accompanying drawings, in which—

Fig. 1 is a top plan view of the forward end of a vehicle in which is embodied my invention;

Fig. 2 is a section on line 2—2 of Fig. 1;

Fig. 3 is a reduced front elevation of Fig. 2;

Fig. 4 is an enlarged section on line 4—4 of Fig. 1;

Fig. 5 is a section on line 5—5 of Fig. 4;

Fig. 6 is a section on line 6—6 of Fig. 4;

Fig. 7 is an enlarged, fragmentary section on line 7—7 of Fig. 1; and

Fig. 8 is a section on line 8—8 of Fig. 7.

We have here shown our invention as embodied in a spring supporting system wherein there are utilized four springs which are arranged in a certain symmetrical grouping, but it will be understood that this is merely illustrative and is in no way to be considered as limitative on the invention, considered in its broader aspects, for the invention may be applied to a spring system wherein a lesser number of spring elements are used and wherein the arrangement of the springs differs from that illustrated.

The frame of a vehicle is generally indicated at 10 and includes side rails 11 and cross braces 12, 13 and 14, the rails and braces 12, 13 being of channel cross-section and brace 12 having a central depending or downwardly bent portion 15.

The spring system is generally indicated at 16 and connection between this system and frame 10 is made through a suspension plate 17 disposed centrally between rails 11 and secured directly at 18 to cross member 13. The rear face of plate 17 is provided with vertically spaced flanges 19 defining a way 20 adapted to take member 13, the channel flanges being tied to flanges 19 by bolts 21.

Springs 22, 23, 24 and 25 are held to plate 17 by boxes or hangers 26, 27, 28 and 29, respectively, said springs and boxes preferably being arranged substantially symmetrically about substantially vertical and horizontal axial planes, whereby the stresses and strains arising from road shocks, traction, etc., are uniformly distributed through the several springs and spring boxes rather than being concentrated on any one or less than the whole number of springs or boxes, a condition which is of obvious advantage.

Each of the boxes so far designated, has an axially alined, companion box, designated by the same numeral with the exponent "a" (see Figs. 5 and 6) the boxes of each pair being horizontally equi-spaced from the longitudinal axis A of frame 10. Since the several pairs of boxes and spring leaf assemblies are substantially identic, we will describe but one of each in detail, choosing for this purpose the pair of boxes 27, 27ª (Figs. 4 and 5). Each box defines a substantially rectangular opening 30, the upper and lower defining walls thereof being presented by the lower face 31 of the horizontal flange 32, and the upper face 33 of the horizontal arm 34 of detachable cap 35, respectively. Opening 30 is also defined by the rearward face 36 of plate boss 37, and the forward face 38 of vertical cap arm 39. Cap 35 is detachably secured to the plate boss by bolts 40 and 41 which are threaded into flange 32 and the lower end of the boss, respectively.

The individual leaves 42 of spring 23 are clipped in the usual manner as at 43, and are provided with registering, centrally arranged nibs and recesses 44 and 45, respectively, whereby the leaves are held against appreciable relative longitudinal movement. A position block 46 is provided with a depending boss 47 which engages the upper face of the uppermost leaf 42ª, said boss being provided with central aperture 48 into which the nib 44ª on said uppermost leaf extends. U-bolt 49 extends about the spring leaves and through ears 50 on opposite sides of block 46 (Fig. 1), and nuts 51 are taken up on this bolt to draw the spring leaves and block closely together. The block is positioned between the opposed side edges 52 of the flanges 32 of the companion boxes, said edges thus serving as shoulders which limit the longitudinal movement of the block and hence bodily movement of the spring longitudinally with respect to plate 17, though the block is capable of vertical movement as the spring flexes.

The mounting of the spring within the boxes may be considered as one which allows a pivotal movement of the spring so that it may flex throughout its length in spite of being held to the frame at two spaced points and of being held against appreciable longitudinal movement, with the result that said spring is most highly efficient and less liable to crystallize by flexure concentrated at the points of support. This pivotal mounting is obtained very simply and without the addition of elements independent of the box by the provision of lugs 53 depending from flange faces 54. The under faces of these lugs, which preferably are arcuate or somewhat rounded at their ends and are of limited extent measured longitudinally of the spring, are the only faces which engage the upper leaf 42ª when the spring is in its normal position. The lugs preferably extend inwardly from about the center of the flanges 32 to a point spaced from edges 52, and preferably the relief or clearances 55 provided at the outer sides of the lugs are not only longer than the relief or clearances 56 at the inner sides of the lugs, but are also of greater vertical extent, as clearly shown in Fig. 5. The inner portions of cap faces 33 preferably incline inwardly and downwardly as at 57, providing clearances 58 between the lowermost spring leaf 42ᵇ and cap arm 34, while the outer extents 59 of faces 33 preferably are in full engagement with said lowermost leaf.

With this arrangement it will be seen that when the outer ends of the spring flex upwardly, as occurs when the spring supported dirigible wheels 60 strike road obstructions, clearances 55 and 56 allow pivotal movement or bowing action of the spring, and should only one of the wheels strike an obstruction tending to raise only one side of the spring, still the spring is free to flex throughout its length, that is, through the mounting and to the other side thereof. Full spring efficiency is thus had irrespective of the nature of the road shock, a feature of obvious advantage.

On rebound action of the spring, the lowermost spring 42$^b$ strikes the horizontal extent 59 of cap face 33, the rebound spring action thus being snubbed. The provision of this snubbing means as an inherent characteristic of the spring mounting rather than through the provision of extraneous mechanisms, is a feature of obvious advantage.

One of the spring leaves of each spring, preferably the lowermost one, though this is not at all necessary, is pivotally connected either to pin 61 or 62, carried by one of the wheel plates 63. The connections are such that flexure of the springs causes parallel, vertical movement of the two wheel plates and the wheels. The wheel plates and their connections with the wheels being identical, we will describe but one in detail. A given wheel-plate carries an outwardly extending, angular knuckle boss 64 which supports an inclined knuckle pin 65, a key 66 extending through the boss and pin to hold them against separative movement. Knuckle member 67 has vertically spaced, angular arms 68 and 68$^a$ which are bushed at 69 to take pin 65, and this member includes a plate portion 70 and a spindle portion 71, the latter preferably being inclined downwardly with respect to the horizontal. Each wheel 60 is mounted for rotation on its associated spindle 71 by the usual hub member 72, nut 73 holding the wheel to the spindle, and roller bearings 74 being interposed between the hub and spindle.

Member 67 carries a plate 75 upon which usual, internal expanding brake mechanism (not shown) is adapted to be mounted and which mechanism is adapted to coact with the wheel carried brake drum 76. It will be seen that wheel plates 63 individually provide independent supporting members for one of a pair of wheels, in contradistinction to the usual, rigid axle which supports both wheels.

From the above, it will be seen that when wheels 60 strike road obstructions and therefore cause a flexure of the supporting springs, said wheels are carried through substantially vertical paths, the wheel plates being maintained substantially in parallel relation.

However, it will also be apparent that as plates 63 move vertically the horizontally measured distance between the wheels or wheel plates varies, and since it is necessary for steering purposes that said wheels or wheel plates be connected by a tie bar, special provision must be made to compensate for this variation in distance, since otherwise the tie bar would be exposed alternately to excessive strains of longitudinal compression or tension, leading to crystallization of the bar and comparative early failure thereof. It will be readily understood that failure of said bar may very readily result disastrously, and therefore our means for compensating this variational distance is a very important feature. Generally, this compensation is provided by the use of an articulated or jointed tie bar which will be hereinafter described with some particularity, said bar being indicated generally at 77.

The upper arm 68 of the left-hand member 67 carries a usual drag link arm or crank 78, while the lower arms 68$^a$ of both members 67 carry rearwardly extending arms 79. Drag link arm 78 is connected through usual universal joint 80 to drag link 81, the rearward end of the latter being connected through universal joint 82 to steering arm 83. The steering arm is mounted for pivotal movement in the usual manner on the frame carried casting 84 and is adapted to be actuated by post 85 through usual steering gears (not shown) within steering gear case 86. Longitudinal movement of link 81 due to actuation of the steering post 85 serves to swing member 63 and hence right hand wheel, as viewed in Fig. 3, about its pin 65, and tie bar 77 which connects the wheel arms 79 imparts like movement to the other dirigible wheel.

Tie bar 77 is made up of a normally central, sliding block 87 from which extend rearward posts or arms 88 (Fig. 8) said arms being equi-spaced from axis A when wheels 60 are straight, and carrying ball members 89 of the universal or ball and socket joints indicated at 90. The complementary parts of the joints are provided on the inner ends of bar sections or rods 91, the outer ends of said rods or sections being connected through universal joints 92 to steering arms 79.

Elongated block 87 is adapted to slide longitudinally through the horizontally extending way 93 provided by the two-part guide casting 94. One part 95 of this casting may comprise the cap for spring boxes or hangers 29 and 29$^a$, the vertical extent 96 of the casting part comprising one of the vertical walls of each box and the horizontal extension 97 comprising the bottom wall thereof. Part 95 may thus be considered as means applying the associated spring to suspension member 17. The upper faces 98 (Fig. 5) of said extensions are fashioned in a manner similar to that described in connection with faces 33 of the upper boxes. Horizontal extensions 97 preferably have depending flanges 99 which are secured at 100 to plate 17; and vertical extensions 101 of the casting part are secured at 102 to the horizontal plate flanges 32$^b$, similar to flange 32. Casting part 95 also includes a rearwardly extending horizontal flange 103 having an upturned lip 104, and this flange and lip together with the horizontal portion 105 and down-turned lip 106 of casting-part 107 define way 93, lips 104 and 106 being vertically spaced to provide a longitudinally extending way 108 for the passage of arms 88. Part 107 is bolted to part 95 at 109 and has rearward, horizontal extensions 110 which are bolted at 111 to cross member 12.

The two part casting 94 thus has the threefold function of providing caps for the lower spring boxes or hangers, a guide for sliding block 87, and a connection between plate 17 and frame 10 through cross member 12 whereby said casting is adapted to act as a torque rod for plate 17.

The tie bar is so fashioned that when the dirigible wheels are pointing straight ahead, block 87 is in such position with respect to casting 94 that arms 88 or joints 90 are substantially equi-distant from the transverse axial plant E (Fig. 7) of the spring system, and the rods 91 are substantially parallel with the springs. The jointing of the tie bar is such that during spring flexure, rods 91 move pivotally in a manner closely to follow the springs and remain substantially parallel thereto so the relation between the horizontally measured distance between a given plate 63 and plate 71 and between a given pair of joints 90 and 92 remains substantially constant.

In other words, rods 91 are so proportioned and pivoted that they swing substantially parallel with the springs during approximate pivotal movement of the latter with respect to the spring boxes, joints 90 being substantially at the centers of spring flexure, which centers are found to be approximately at points spaced outwardly from the centers of the spring boxes, as is apparent in Fig. 7.

When both wheels strike road obstructions simultaneously in a manner to flex both sides of the spring equally, block 87 remains stationary and rods 91 merely swing in opposite directions about posts 88. When only one wheel encounters a road obstruction the spring ends at that side flex more pronouncedly than do the spring ends at the other side of plate 17 and under such conditions block 87 has slight longitudinal movement, but this movement is desirable rather than undesirable since it shifts the tie-bar in a manner to compensate the lessened flexure of the spring at the other side of the mounting and therefore causes the maintenance of the wheels in substantially parallel condition without over-stressing either rod 91.

Of course, when the right-hand wheel (as viewed in Fig. 3) is swung about its pin 65 due to actuation of crank 78, the associated rod 91 is moved longitudinally, and this movement is imparted through block 87 to the opposite rod 91 so the opposite wheel is moved equally and the two wheels are maintained in correct relationship.

It will be understood the drawings and description are to be considered merely as illustrative of and not restrictive on the broader claims appended hereto, for various changes in design, structure and arrangement may be made without departing from the spirit and scope of said claims.

We claim:

1. In combination, a vehicle frame, a suspension member extending crosswise of the frame, a plurality of springs arranged transversely of the longituidnal axis of the frame, means applying said springs intermediate their ends to said suspension member, a pair of wheel-supporting members connected one each to the opposite ends of the springs, a pair of wheels connected one each to said supporting members through steering knuckles, a block supported by said suspension member for bodily sliding movement transversely of said axis, a pair of rods extending oppositely from the block, one to each of the wheel-supporting members, and pivotal connections between the rods and wheel-supporting members whereby said rods are adapted to move pivotally in substantial conformance with flexures of the springs.

2. In combination, a vehicle frame, a suspension member extending crosswise of the frame, a plurality of springs arranged transversely of the longitudinal axis of the frame, means applying said springs intermediate their ends to said suspension member, a pair of wheel-supporting members connected one each to the opposite ends of the springs, a pair of wheels connected one each to said supporting members through steering knuckles, a block mounted on said applying means for bodily sliding movement transversely of said axis, a pair of rods extending oppositely from the block, one to each of the wheel-supporting members, and pivotal connections between the rods and wheel-supporting members whereby said rods are adapted to move pivotally in substantial conformance with flexures of the springs.

In witness that we claim the foregoing we have hereunto subscribed our names this first day of December, 1926.

OSCAR F. LUNDELIUS.
MELVIN N. LEFLER.